United States Patent
Suzuki

(10) Patent No.: US 8,910,615 B2
(45) Date of Patent: Dec. 16, 2014

(54) CONTROL APPARATUS FOR INTERNAL COMBUSTION ENGINE

(75) Inventor: Yusuke Suzuki, Hadano (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/982,304

(22) PCT Filed: Feb. 2, 2011

(86) PCT No.: PCT/JP2011/052163
§ 371 (c)(1),
(2), (4) Date: Jul. 29, 2013

(87) PCT Pub. No.: WO2012/105012
PCT Pub. Date: Aug. 9, 2012

(65) Prior Publication Data
US 2013/0311064 A1    Nov. 21, 2013

(51) Int. Cl.
| | |
|---|---|
| *F02B 3/12* | (2006.01) |
| *F02D 41/14* | (2006.01) |
| *F02D 35/02* | (2006.01) |
| *F02D 41/22* | (2006.01) |
| *F02D 41/40* | (2006.01) |
| *G01L 23/22* | (2006.01) |
| *F02D 41/30* | (2006.01) |
| *F02D 41/00* | (2006.01) |

(52) U.S. Cl.
CPC .......... *F02D 41/1486* (2013.01); *F02D 41/402* (2013.01); *G01L 23/221* (2013.01); *F02D 41/3047* (2013.01); *G01L 23/22* (2013.01); *F02D 35/023* (2013.01); *F02D 41/009* (2013.01); *F02D 41/22* (2013.01); *F02D 41/401* (2013.01); *Y02T 10/44* (2013.01)
USPC .......... 123/435; 123/299; 123/300; 123/305; 701/103; 701/111

(58) Field of Classification Search
CPC ... F02D 41/1486; F02D 41/009; F02D 41/22; F02D 41/401; F02D 41/402; F02D 41/403; F02D 41/3047; G01L 23/22; G01L 23/221
USPC .......... 123/299, 300, 305, 435; 701/102–105, 701/111; 73/114.01
See application file for complete search history.

(56) References Cited

U.S. PATENT DOCUMENTS

| | | | |
|---|---|---|---|
| 6,032,650 A | * | 3/2000 | Rask ............................. 123/435 |
| 7,779,813 B2 | * | 8/2010 | Hahn ........................ 123/406.47 |
| 2007/0215111 A1 | * | 9/2007 | Surnilla ........................ 123/431 |
| 2010/0242912 A1 | | 9/2010 | Folkerts et al. |
| 2011/0239986 A1 | * | 10/2011 | Shishime et al. ........ 123/406.29 |

FOREIGN PATENT DOCUMENTS

| | | |
|---|---|---|
| DE | 10 2010 029 665 | 12/2010 |
| JP | 2003-206796 | 7/2003 |
| JP | 2005-9457 | 1/2005 |
| JP | 2010-71284 | 4/2010 |
| JP | 2010-133367 | 6/2010 |
| WO | WO 2010/124699 | 11/2010 |

* cited by examiner

*Primary Examiner* — Thomas Moulis
(74) *Attorney, Agent, or Firm* — Finnegan, Henderson, Farabow, Garrett & Dunner, LLP

(57) ABSTRACT

An object of this invention is to provide a control apparatus for an internal combustion engine which makes it possible to reliably avoid an abnormal increase in in-cylinder pressure due to pre-ignition. The control apparatus of this invention controls an internal combustion engine including an injector that directly injects fuel into a cylinder. The control apparatus includes pre-ignition detection means that executes an operation to detect pre-ignition until a time of a crank angle θA, and injection instruction means that, at a time of a crank angle θB that is before the crank angle θA, sends to the injector an injection instruction to perform fuel injection that suppresses pre-ignition combustion. Preferably, the control apparatus includes energization stopping means that, when the pre-ignition detection means does not detect pre-ignition until the time of the crank angle θA, stops energization of the injector that is started by the injection instruction.

12 Claims, 5 Drawing Sheets

CONTROL APPARATUS FOR INTERNAL COMBUSTION ENGINE

CROSS-REFERENCE TO RELATED APPLICATIONS

This application is a national phase application of International Application No. PCT/JP2011/052163, filed Feb. 2, 2011, the content of which is incorporated herein by reference.

TECHNICAL FIELD

The present invention relates to a control apparatus for an internal combustion engine.

BACKGROUND ART

A phenomenon called "pre-ignition" sometimes occurs in an internal combustion engine. Pre-ignition occurs when an air-fuel mixture in a cylinder ignites prior to the intended ignition by a spark plug. When pre-ignition occurs, an abnormally high in-cylinder pressure is generated, and there is a risk of the engine being damaged. There is also the problem that knocking is induced by the pre-ignition and noise is generated.

Ions are generated when pre-ignition occurs. If the ions reach the electrodes of a spark plug, an ion current flows between the electrodes of the spark plug due to the ions. An apparatus disclosed in Patent Literature 1 that is mentioned below detects the aforementioned ion current and thereby detects the occurrence of pre-ignition. According to Patent Literature 1, it is assumed that pre-ignition occurs due to heat of the spark plug itself. With the apparatus disclosed in Patent Literature 1, when occurrence of pre-ignition is detected, fuel injection is performed in the vicinity of top dead center of an intake stroke so that fuel reaches the spark plug. More specifically, fuel injection is performed so that fuel that has been injected from an in-cylinder injector strikes against the top face of the piston so that the direction of the fuel is changed towards the spark plug side and the fuel reaches the spark plug. The pre-ignition is suppressed as a result of the temperature of the spark plug being lowered by heat of vaporization of the fuel that has reached the spark plug.

Patent Literature 2 that is mentioned below discloses technology that calculates a compression pressure ratio ($\Delta PT/\Delta P0$) between a compression pressure (PT) at top dead center of the crank angle and a reference in-cylinder pressure (P0) during a compression stroke as well as an in-cylinder pressure change rate ($\Delta P/\Delta \theta$) with respect to a crank angle ($\theta$) of the in-cylinder pressure (P), and uses these values to determine whether or not pre-ignition and knocking is occurring. When only pre-ignition is occurring, the air-fuel ratio of the engine is increased, and when both pre-ignition and knocking are occurring the air-fuel ratio of the engine is increased and a timing for starting fuel injection is also delayed.

Patent Literature 3 that is mentioned below discloses technology that detects pre-ignition by comparing an in-cylinder pressure that is predicted by a physical model and an in-cylinder pressure that is measured by an ha-cylinder pressure sensor, and suppresses pre-ignition by injecting fuel again from an in-cylinder injector when pre-ignition has been detected.

CITATION LIST

Patent Literature

Patent Literature 1: Japanese Patent Laid-Open No. 2003-206796
Patent Literature 2: Japanese Patent Laid-Open No. 2005-9457
Patent Literature 3: Japanese Patent Laid-Open No. 2010-71284

SUMMARY OF INVENTION

Technical Problem

According to Patent Literature 1 it is assumed that pre-ignition is caused by heat of a spark plug itself. However, recent research indicates that pre-ignition is not necessarily caused by the heat of a spark plug. For example, in some cases deposits (carbon) that have accumulated on a wall of a combustion chamber detach therefrom, and the detached pieces serve as a fire source and pre-ignition occurs. Therefore, even if the temperature of the spark plug is lowered, it is difficult to reliably suppress pre-ignition.

Further, according to Patent Literature 1, injection of fuel to suppress pre-ignition is performed in the vicinity of top dead center of an intake stroke, that is, before a crank angle at which it is possible for pre-ignition to occur. Consequently, even when pre-ignition has been detected, pre-ignition combustion in the cycle in which the pre-ignition is detected can not be suppressed. Therefore, an abnormal increase in the in-cylinder pressure in the cycle in which pre-ignition is detected can not be avoided. With the technology disclosed in Patent Literature 2 that suppresses pre-ignition by changing an air-fuel ratio or a timing for starting fuel injection also, there is similarly the problem that pre-ignition combustion can not be suppressed in the cycle in which the pre-ignition is detected, and hence an abnormal increase in the in-cylinder pressure in the cycle in which pre-ignition is detected can not be avoided.

Patent Literature 3 describes that it is possible to extinguish or dampen a pre-ignition flame by re-injecting fuel from an in-cylinder injector in a cycle in which the pre-ignition is detected. However, there is some doubt about whether such an effect is obtained in practice. As is known, after an injection signal from a control unit enters an "on" state, there is an operation delay until an injector opens and fuel is actually injected. Therefore, even if re-injection of fuel is performed after pre-ignition has been detected, it is already too late to extinguish or dampen the flame, and the pre-ignition flame is already spreading inside the cylinder at the time point that fuel is actually injected. It is therefore difficult to avoid an abnormal increase in the in-cylinder pressure.

The present invention has been conceived to solve the above described problems, and an object of the present invention is to provide a control apparatus for an internal combustion engine that makes it possible to reliably avoid an abnormal increase in an in-cylinder pressure caused by pre-ignition.

Solution to Problem

A first invention for achieving the above object is a control apparatus for an internal combustion engine that is an apparatus that controls an internal combustion engine including an injector that directly injects fuel into a cylinder, the control apparatus comprising:

pre-ignition detection means that executes an operation to detect pre-ignition until a time of a crank angle θA; and injection instruction means that, at a time of a crank angle θB that is before the crank angle θA, sends to the injector an injection instruction for performing a fuel injection to suppress pre-ignition combustion.

A second invention is in accordance with the first invention, further comprising injection control means that, if the pre-ignition detection means detects pre-ignition by the time of the crank angle θA, continuously performs fuel injection according to the injection instruction for a predetermined time period or until a crank angle θC that is after the crank angle θA.

A third invention is in accordance with the first or the second invention, further comprising energization stopping means that, in a case where the pre-ignition detection means does not detect pre-ignition until the time of the crank angle θA, stops energization of the injector that is started by the injection instruction.

A fourth invention is in accordance with the third invention, wherein a period of time from the crank angle θB until the crank angle θA is less than or equal to a period of time that corresponds to a valve-opening delay time period of the injector.

A fifth invention is in accordance with the third invention, wherein the time of the crank angle θA is after a time point at which the injector opens in accordance with the injection instruction and is before a scheduled ending time point of the fuel injection according to the injection instruction.

A sixth invention is in accordance with any one of the first to the fifth inventions, further comprising:

possibility determination means that determines whether or not an operating state of the internal combustion engine is a state in which there is a possibility of pre-ignition occurring;

wherein when a determination result of the possibility determination means is affirmative, the injection instruction means sends the injection instruction.

A seventh invention is in accordance with any one of the first to the sixth inventions, wherein the crank angle θB is within a compression stroke range.

An eighth invention is in accordance with any one of the first to the seventh inventions, wherein the crank angle θB is a crank angle that is before an earliest crank angle at which it is possible for pre-ignition to occur.

A ninth invention is in accordance with any one of the first to the eighth inventions, further comprising:

an in-cylinder pressure sensor that detects a pressure in the cylinder; and index value calculation means that calculates an index value that serves as an index of an amount of heat generation, based on an in-cylinder pressure that is detected by the in-cylinder pressure sensor;

wherein the pre-ignition detection means determines presence or absence of occurrence of pre-ignition based on the index value that is calculated by the index value calculation means.

A tenth invention is in accordance with the ninth invention, wherein when the in-cylinder pressure is represented by "P", a volume inside the cylinder is represented by "V", and a ratio of specific heat of in-cylinder gas is represented by "κ", the index value is represented by $PV^\kappa$.

A eleventh invention is in accordance with the ninth invention, wherein when the in-cylinder pressure is represented by "P", a volume inside the cylinder is represented by "V", a ratio of specific heat of in-cylinder gas is represented by "κ", and a crank angle is represented by "θ", the index value is represented by $d(PV^\kappa)/d\theta$.

Advantageous Effects of Invention

According to the first invention, the fuel injection to suppress pre-ignition combustion can be reliably performed in time for the start of pre-ignition combustion. It is therefore possible to reliably extinguish or dampen a pre-ignition flame at an initial time point. Hence, an abnormal increase in an in-cylinder pressure due to pre-ignition can be reliably avoided.

According to the second invention, an abnormal increase in an in-cylinder pressure due to pre-ignition can be avoided more reliably.

According to the third invention, in a cycle in which occurrence of pre-ignition has not been detected until the time of the crank angle θA, the amount of fuel that is injected can be reduced. Thus, the overall amount of fuel that is injected to suppress pre-ignition can be reduced, and lower fuel consumption can be achieved. In addition, an air-fuel ratio deviation that is caused by performing fuel injection to suppress pre-ignition can be suppressed, and lower emissions can be achieved.

According to the fourth invention, the fuel injection to suppress pre-ignition is not performed in a cycle in which the occurrence of pre-ignition has not been detected until the time of the crank angle θA. Therefore, even lower fuel consumption and lower emissions can be achieved.

According to the fifth invention, a flame of pre-ignition which starts comparatively late can be reliably extinguished or dampened. Consequently, an abnormal increase in an in-cylinder pressure can be avoided more reliably.

According to the sixth invention, since the fuel injection to suppress pre-ignition is not performed in an operating state which is not a state in which there is a possibility of pre-ignition occurring, in addition to achieving lower fuel consumption, lower emissions are achieved since an air-fuel ratio deviation does not occur.

According to the seventh invention, the fuel injection to suppress pre-ignition combustion can be reliably performed in time for the start of pre-ignition combustion.

According to the eighth invention, the fuel injection to suppress pre-ignition combustion can be reliably performed in time for the start of pre-ignition combustion.

According to the ninth invention, the occurrence of pre-ignition can be accurately detected at an early stage. As a result, prevention of an abnormal increase in the in-cylinder pressure as well as a higher level of reduction in the fuel consumption and emissions can be achieved in a compatible manner.

According to the tenth invention, the occurrence of pre-ignition can be accurately detected at an early stage. As a result, prevention of an abnormal increase in the in-cylinder pressure as well as a higher level of reduction in the fuel consumption and emissions can be achieved in a compatible manner.

According to the eleventh invention, the occurrence of pre-ignition can be accurately detected at an early stage. As a result, prevention of an abnormal increase in the in-cylinder pressure as well as a higher level of reduction in the fuel consumption and emissions can be achieved in a compatible manner.

DESCRIPTION OF EMBODIMENTS

Embodiment 1

Figure 1:
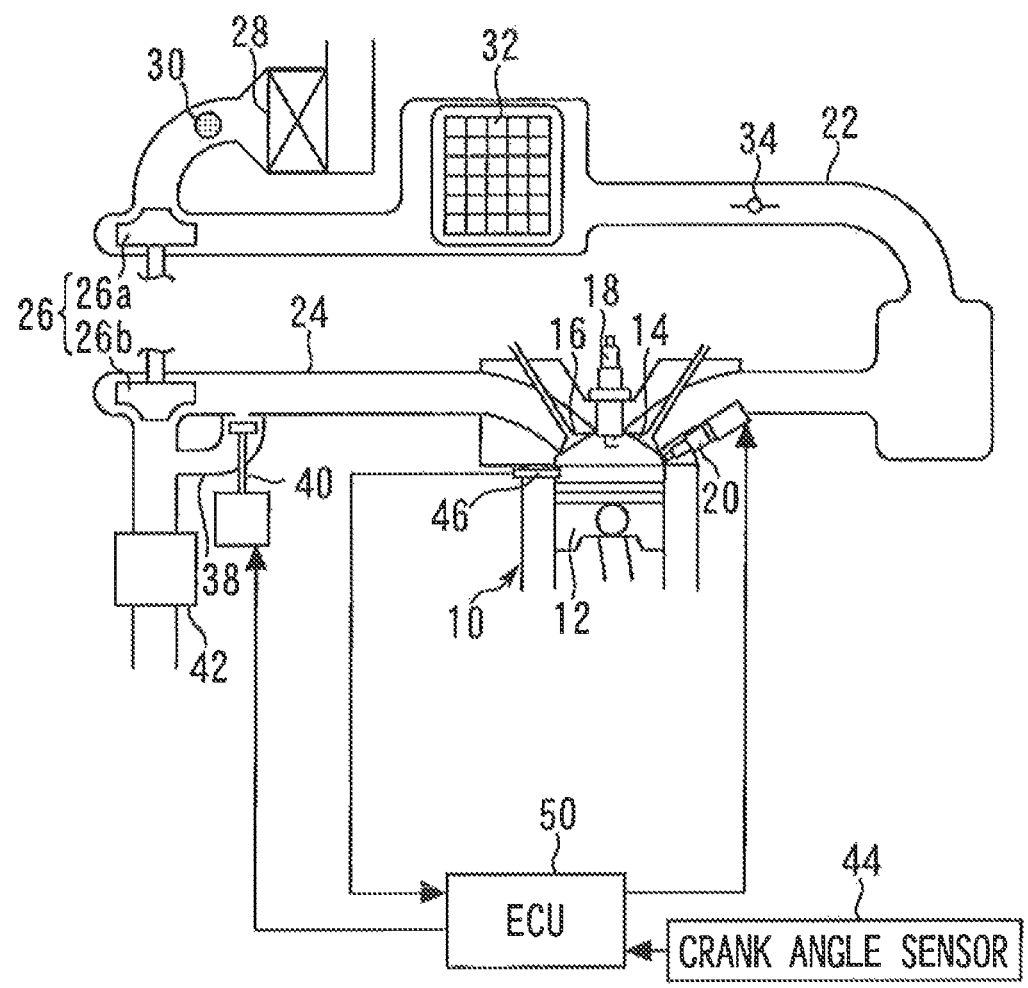
FIG. 1 is a view for describing a system configuration of Embodiment 1 of the present invention.

FIG. 1 is a view for describing the system configuration of Embodiment 1 of the present invention. As shown in FIG. 1, the system of Embodiment 1 of the present invention includes a spark-ignition internal combustion engine 10. The number of cylinders and the arrangement of the cylinders of the internal combustion engine 10 are not particularly limited. In FIG. 1, only one cylinder is depicted as a representative cylinder.

A piston 12, an intake valve 14, an exhaust valve 16, a spark plug 18 and an injector 20 that injects fuel directly into the cylinder (into a combustion chamber) are provided in each cylinder of the internal combustion engine 10. An intake passage 22 and an exhaust passage 24 are connected to each cylinder.

The internal combustion engine 10 has a turbocharger 26 as a supercharger. The turbocharger 26 includes a compressor 26a and a turbine 26b. The compressor 26a is disposed partway along the intake passage 22. The turbine 26b is disposed partway along the exhaust passage 24.

An air cleaner 28 and an air flow meter 30 that detects an intake air amount are provided in the intake passage 22 on an upstream side of the compressor 26a. An intercooler 32 and a throttle valve 34 are provided in the intake passage 22 on a downstream side of the compressor 26a.

A bypass passage 38 that links the exhaust passage 24 on the upstream side of the turbine 26b and the exhaust passage 24 on the downstream side thereof, and a bypass valve 40 (waste gate valve) that can open and close the bypass passage 38 are arranged in the vicinity of the turbine 26b. When the bypass valve 40 opens, a part of exhaust gas flows through the bypass passage 38 and does not pass through the turbine 26b. A catalytic converter 42 that purifies exhaust gas is arranged in the exhaust passage 24 on the downstream side of the turbine 26b. A high purification rate is obtained by the catalytic converter 42 when an air-fuel ratio of exhaust gas that flows into the catalytic converter 42 is in the vicinity of a theoretical air-fuel ratio.

The system of the present embodiment further includes a crank angle sensor 44 that detects a rotational angle of a crankshaft of the internal combustion engine 10, an in-cylinder pressure sensor 46 that detects an in-cylinder pressure, and an ECU (Electronic Control Unit) 50 that controls the operating state of the internal combustion engine 10. The various sensors and actuators that are described above are electrically connected to the ECU 50.

The ECU 50 controls the operation of the internal combustion engine 10 by driving the respective actuators based on information detected by the respective sensors. For example, the ECU 50 calculates a fuel injection amount based on a engine speed detected by the crank angle sensor 44 and an intake air amount detected by the air flow meter 30, and after deciding the fuel injection timing and ignition timing and the like based on the crank angle, drives the injector 20 and the spark plug 18. In the internal combustion engine 10 of the present embodiment, the main fuel injection (normal fuel injection) from the injector 20 is performed in an intake stroke. Alternatively, the main fuel injection is performed over a period from an intake stroke to the first half of a compression stroke. An air-fuel mixture is formed in the cylinder by this fuel injection, and the air-fuel mixture is ignited by the spark plug 18 and combusts.

The term "pre-ignition" refers to a situation where an air-fuel mixture in a cylinder ignites prior to a normal ignition timing, and in the case of the internal combustion engine 10 of the present embodiment, refers to an air-fuel mixture in a cylinder igniting prior to ignition by the spark plug 18. Although the full facts about the principles that lead to the occurrence of pre-ignition are not necessarily clear, for example, it is considered that in some cases deposits (carbon) that have accumulated on a wall of the combustion chamber detach therefrom, and the detached pieces serve as a fire source and pre-ignition occurs. Pre-ignition does not occur in all operating regions, and there is a tendency for pre-ignition to occur in specific operating regions. In the case of the internal combustion engine 10 of the present embodiment that includes a supercharger, there is a possibility of pre-ignition occurring in a region in which there is a low engine speed and a high engine load (hereunder, referred to as "low-speed and high-load region").

If combustion due to pre-ignition starts and the air-fuel mixture combusts at an earlier stage than originally intended, the in-cylinder pressure rises abnormally, and hence there is a risk that the internal combustion engine 10 will be damaged. There is also the problem that pre-ignition induces knocking and therefore causes noise.

The ECU 50 of the present embodiment can execute an operation (hereunder, referred to as a "pre-ignition detection operation") that can detect the occurrence of pre-ignition in real time on the basis of an in-cylinder pressure detected by the in-cylinder pressure sensor 46. The pre-ignition detection operation according to the present embodiment will now be described. When an in-cylinder pressure detected by the in-cylinder pressure sensor 46 is represented by "P", an in-cylinder volume is represented by "V", and a ratio of specific heat of in-cylinder gas is represented by "$\kappa$", the ECU 50 can calculate $PV^\kappa$ as an index value of an amount of heat generation. A value of the in-cylinder volume V is a function of the crank angle $\theta$, and is stored in advance in the ECU 50. A value of the ratio of specific heat $\kappa$ is also stored in advance in the ECU 50. A value of $PV^\kappa$ correlates with a quantity of heat that is generated in the cylinder. When the air-fuel mixture ignites due to pre-ignition, heat is produced in the cylinder, and hence the value of $PV^\kappa$ rises.

Figure 2:
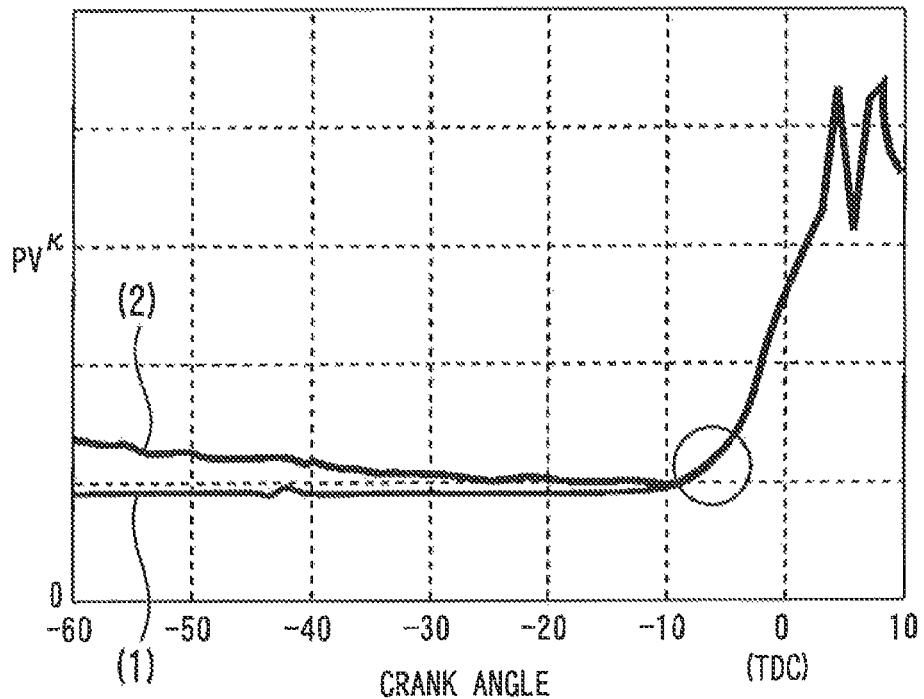
FIG. 2 is a view illustrating an example of a change in a value of $PV^\kappa$ in a case where pre-ignition occurred.

The ECU 50 repeatedly calculates a value of $PV^\kappa$ for each unit crank angle or each unit time in a period of time from a predetermined crank angle before compression top dead center (TDC) until a predetermined crank angle $\theta A$ before the ignition timing. The ECU 50 determines that pre-ignition has occurred if the calculated value of $PV^\kappa$ exceeds a predetermined threshold value. FIG. 2 is a view illustrating an example of a change in the value of $PV^\kappa$ in a case where pre-ignition occurred. In the example shown in the FIG. 2, the ECU 50 determines that pre-ignition occurred at a position enclosed by a circle.

A method that determines the occurrence of pre-ignition by comparing a value of the in-cylinder pressure P detected by the in-cylinder pressure sensor 46 with a model in-cylinder pressure that is predicted based on a physical model or the like may also be considered as a method for detecting pre-ignition. However, since the in-cylinder pressure rises as the result of compression in a compression stroke even if pre-ignition has not occurred, it is difficult to distinguish whether or not the in-cylinder pressure P detected by the in-cylinder pressure sensor 46 is being affected by pre-ignition. Therefore, according to this method, it is difficult to detect the occurrence of pre-ignition at an early stage (a time point at the start of combustion), and an accurate detection can not be performed until the pre-ignition combustion spreads.

In contrast, the index value of the amount of heat generation such as the above described $PV^\kappa$ is maintained at a substantially constant value before pre-ignition occurs, and rises suddenly from the moment pre-ignition occurs. Therefore, according to the present embodiment, by performing a pre-ignition detection operation based on this index value of the amount of heat generation, the occurrence of pre-ignition can be accurately detected at an early stage (a time point at the start of combustion).

Figure 3:
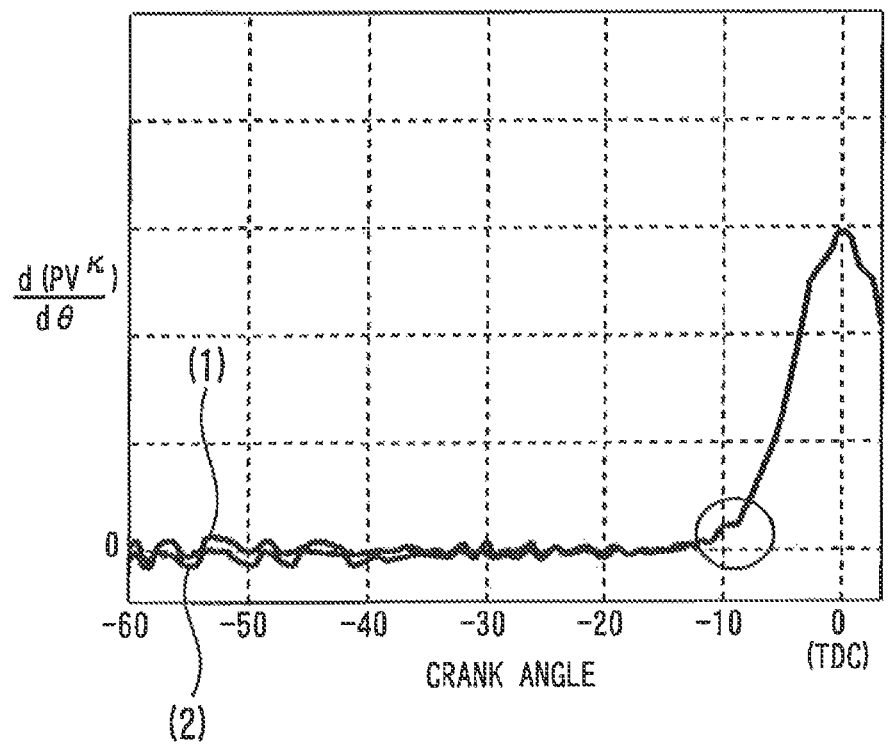
FIG. 3 is a view illustrating an example of a change in a value of $d(PV^\kappa)/d\theta$ in a case where pre-ignition occurred.

Further, according to the pre-ignition detection operation of the present embodiment, $d(PV^\kappa)/d\theta$ that is a value obtained by differentiating $PV^\kappa$ with respect to the crank angle $\theta$ may be used instead of $PV^\kappa$ as an index value of the amount of heat generation. The ECU 50 can calculate $d(PV^\kappa)/d\theta$ by dividing a variation in $PV^\kappa$ by a variation in the crank angle $\theta$. In this case, the ECU 50 repeatedly calculates a value of $d(PV^\kappa)/d\theta$ for each unit crank angle or each unit time until the time of the crank angle $\theta A$. The ECU 50 determines that pre-ignition has occurred if the calculated value of $d(PV^\kappa)/d\theta$ exceeds a predetermined threshold value. FIG. 3 is a view illustrating an example of a change in the value of $d(PV^\kappa)/d\theta$ in a case where pre-ignition occurred. In the example shown in the FIG. 3, the ECU 50 determines that pre-ignition occurred at a position enclosed by a circle.

When $d(PV^\kappa)d\theta$ is used, the following additional advantages are obtained in comparison to a case where $PV^\kappa$ is used. When pre-ignition has occurred, there is a tendency for $d(PV^\kappa)/d\theta$ to begin to rise earlier than the beginning of a rise in $PV^\kappa$. Consequently, the occurrence of pre-ignition can be accurately determined at an earlier stage. There is also the advantage that the value of $d(PV^\kappa)/d\theta$ is not affected by an offset drift in the output of the in-cylinder pressure sensor 46. It is known that in some cases the output of the in-cylinder pressure sensor 46 deviates due to the influence of temperature characteristics of a circuit contained therein. In FIG. 2 and FIG. 3, a graph in a case where the output of the in-cylinder pressure sensor 46 is normal is denoted by reference numeral (1), and a graph in a case where the output has deviated is denoted by reference numeral (2). As shown in FIG. 2, when the output of the in-cylinder pressure sensor 46 has deviated, a deviation also arises in the value of $PV^\kappa$. Consequently, when using $PV^\kappa$, it is necessary to set a threshold value for determining pre-ignition to a relatively larger value to prevent erroneous detection in a case where the output of the in-cylinder pressure sensor 46 has deviated. In contrast, as shown in FIG. 3, even when the output of the in-cylinder pressure sensor 46 has deviated, it is difficult for a deviation to arise in the value of $d(PV^\kappa)/d\theta$. Therefore, when using $d(PV^\kappa)/d\theta$, since erroneous detection in a case where the output of the in-cylinder pressure sensor 46 has deviated is not a concern, a threshold value for determining pre-ignition can be set to a relatively smaller value. For this reason also, it is possible to determine the occurrence of pre-ignition at an earlier stage.

Figure 4:
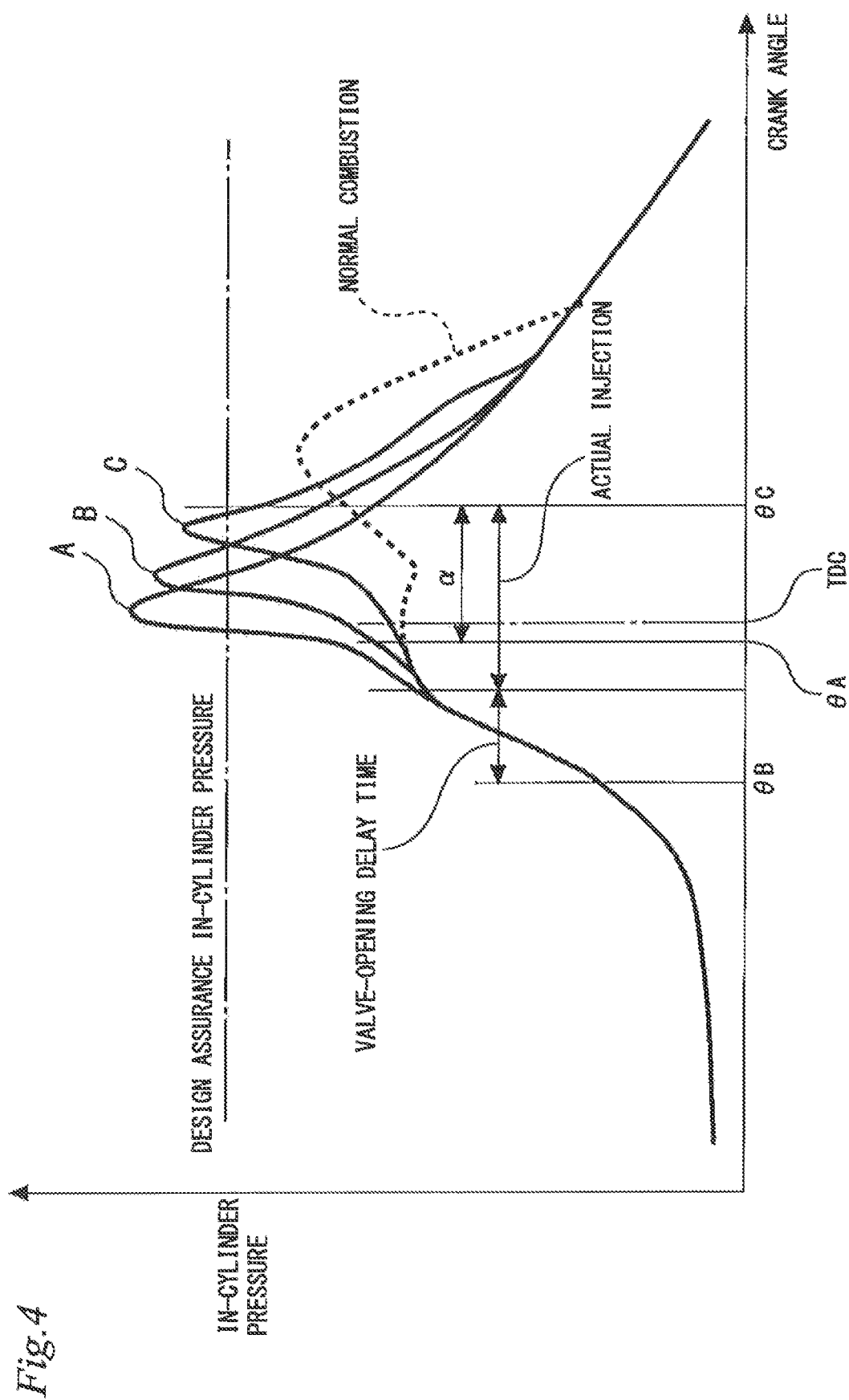
FIG. 4 is a graph that illustrates in-cylinder pressures in a compression stroke and an expansion stroke.

FIG. 4 is a graph that illustrates in-cylinder pressures in a compression stroke and an expansion stroke of the internal combustion engine 10. Reference characters A, B, and C in FIG. 4 each denote an example (form) of the in-cylinder pressure in a case where pre-ignition occurred and combustion was performed. On the other hand, a broken line represents the in-cylinder pressure in the case of normal combustion, that is, when combustion started as the result of ignition by the spark plug 18. In the example shown in FIG. 4, the ignition timing is after compression top dead center. Therefore, in the case of normal combustion, after the in-cylinder pressure has begun to decrease after compression top dead center is passed, combustion starts and the in-cylinder pressure rises.

As shown by reference characters A to C in FIG. 4, when combustion starts due to pre-ignition and the air-fuel mixture combusts at an earlier stage than originally intended, the in-cylinder pressure rises to an abnormally high pressure in comparison to the case of normal combustion. The causes of pre-ignition include a random event such as the above described detachment of deposits. Consequently, there is a certain degree of variation in the timings at which the pre-ignition occurs. Reference character A in FIG. 4 denotes a form in which the start of combustion is earliest, reference character B denotes a form in which the start of combustion is later than in the case denoted by reference character A, and reference character C denotes a form in which the start of combustion is later than in the case denoted by reference character C.

When an air-fuel mixture that has been ignited by pre-ignition combusts as it is in that state, as shown by reference characters A to C in FIG. 4, in some cases the in-cylinder pressure rises to a pressure that exceeds a design assurance in-cylinder pressure of the internal combustion engine 10. In such a case, there is a risk that the internal combustion engine 10 will be damaged. To reliably prevent damage to the internal combustion engine 10, it is desirable to avoid as much as possible a situation in which the in-cylinder pressure exceeds the design assurance in-cylinder pressure, even if only for a single cycle. Accordingly, an ideal configuration is one such that, when occurrence of pre-ignition is detected in real time, an abnormal increase in the in-cylinder pressure can be avoided in the same cycle as the cycle in which the pre-ignition is detected. In other words, it is ideal to adopt a configuration that makes it possible to avoid an abnormal increase in the in-cylinder pressure that is caused by the detected pre-ignition itself. To realize this ideal, when pre-ignition is detected, it is necessary to suppress pre-ignition combustion before the in-cylinder pressure suddenly rises. That is, if a flame produced by pre-ignition can be extinguished or dampened to prevent the spread of combustion, an abnormal increase in the in-cylinder pressure can be avoided. It is effective to inject fuel from the injector 20 at the time that pre-ignition occurs to extinguish or dampen the pre-ignition flame. By injecting fuel from the injector 20 at the time that pre-ignition occurs, the area around the pre-ignition flame enters a state in which combustion is not possible because the fuel concentration is too high, and hence the flame can be extinguished or dampened. Fuel injection that is performed to suppress pre-ignition combustion in this manner is referred to hereinafter as "pre-ignition suppression injection".

However, in a configuration in which detection of pre-ignition serves as a trigger for the ECU 50 to send an injection instruction to the injector 20, the fuel injection is executed too late to avoid an abnormal increase in the in-cylinder pressure. The reason is that a delay arises before fuel is actually injected, as time is required for the process in which the ECU 50 switches the injection signal "on" and the injector 20 is energized and the plunger moves to open the valve. During this valve-opening delay time period the pre-ignition flame spreads to a degree such that it can no longer be extinguished, and therefore even if fuel is injected thereafter, an abnormal increase in the in-cylinder pressure can not be avoided.

In view of this fact, the ECU 50 of the present system is configured to send an injection instruction for pre-ignition suppression injection at a timing that is before the earliest crank angle at which it is possible for pre-ignition to occur. A predetermined crank angle θB at which the ECU 50 sends an injection instruction to the injector 20 is set to a crank angle that is before a crank angle θA at which the pre-ignition detection operation ends. As shown in FIG. 4, preferably the crank angle θB is set so as to be in the vicinity of a time point that is prior to the time point at the start of pre-ignition combustion A, which is the form in which the start of combustion is earliest, by a time period corresponding to the valve-opening delay time period of the injector 20. By setting the crank angle θB in this manner, since the actual injection of fuel as the pre-ignition suppression injection can be started in time for the start of combustion of the pre-ignition A that is the form in which the start of combustion is earliest, a pre-ignition flame can be reliably extinguished or dampened at an initial time point. Thus, abnormal increases in the in-cylinder pressure as denoted by reference characters A to C in FIG. 4 can be prevented, and the in-cylinder pressure can be reliably prevented from exceeding the design assurance in-cylinder pressure.

As described above, the ECU 50 executes a pre-ignition detection operation until the time of the crank angle θA. The crank angle θA is set so as to be a crank angle that is before the ignition timing or a crank angle that is before a crank angle at which an increase in the in-cylinder pressure caused by normal combustion starts. If the occurrence of pre-ignition is detected by the time of the crank angle θA, fuel injection as the pre-ignition suppression injection is continuously performed for a predetermined time period or until reaching a predetermined crank angle θC after the crank angle θA. Thus, when pre-ignition has occurred, the pre-ignition flame is reliably extinguished or dampened by continuing the fuel injection as the pre-ignition suppression injection, and an abnormal increase in the in-cylinder pressure can be reliably prevented.

On the other hand, if the occurrence of pre-ignition is not detected until the time of the crank angle θA, the ECU 50 stops energization of the injector 20 at the time of the crank angle θA. By stopping energization of the injector 20 in this manner, if the actual injection of fuel for the pre-ignition suppression injection has already started, the injection of fuel is ended partway through the scheduled process, while if the actual injection of fuel has not yet started, the injection of fuel is cancelled before starting.

As shown in FIG. 4, it is preferable to set the crank angle θA close to a time point at which it is possible to detect pre-ignition as in form C in which the start of combustion is latest among the examples of pre-ignition for which the in-cylinder pressure may exceed a design assurance in-cylinder pressure if the flame is not extinguished. As will be understood from FIG. 4, the later the time point at which combustion starts is, the lower the maximum in cylinder pressure caused by pre-ignition tends to be. Therefore, with respect to pre-ignition that is detected after passing the crank angle θA, it can be considered that there is no risk of the pre-ignition causing the in-cylinder pressure to exceed the design assurance in-cylinder pressure, even if the flame is not extinguished. Accordingly, in a case where occurrence of pre-ignition is not detected until the time of the crank angle θA, even if the pre-ignition suppression injection is ended partway through the scheduled process or if the pre-ignition suppression injection is cancelled before starting, there is no problem since the in-cylinder pressure will not exceed the design assurance in-cylinder pressure.

In the example shown in FIG. 4, the time of the crank angle θA is after a time point at which fuel injection as the pre-ignition suppression injection actually starts, that is, a time point at which the injector 20 opens. In this case, irrespective of whether or not pre-ignition occurs, the actual fuel injection as the pre-ignition suppression injection starts. If the occurrence of pre-ignition is not detected until the time of the crank angle θA, the actual injection is ended partway through the scheduled process. In this case, compared to a case where the pre-ignition suppression injection is executed until reaching the crank angle θC that is the scheduled ending time point, fuel consumption can be reduced by an amount corresponding to the amount of fuel that would be injected in a period of time denoted by reference character α (from the crank angle θA to the crank angle θC) in FIG. 4.

Thus, according to the present embodiment, the pre-ignition suppression injection is continuously executed as scheduled until the time of the crank angle θC only in a cycle in which the occurrence of pre-ignition was detected by the time of the crank angle θA. On the other hand, in a cycle in which the occurrence of pre-ignition was not detected until the time of the crank angle θA, the pre-ignition suppression injection ends at the time of the crank angle θA that is before the crank angle θC that is the scheduled ending time point. It is thereby possible to reduce the amount of fuel used for the pre-ignition suppression injection relative to the scheduled fuel amount in a cycle in which the occurrence of pre-ignition was not detected until the time of the crank angle θA. Therefore, according to the present embodiment, lower fuel consumption is achieved in comparison to a case in which pre-ignition suppression injection of the same amount of fuel is performed in each cycle. Further, since an air-fuel ratio deviation that is caused by pre-ignition suppression injection can be suppressed, lower emissions are achieved.

Figure 5:
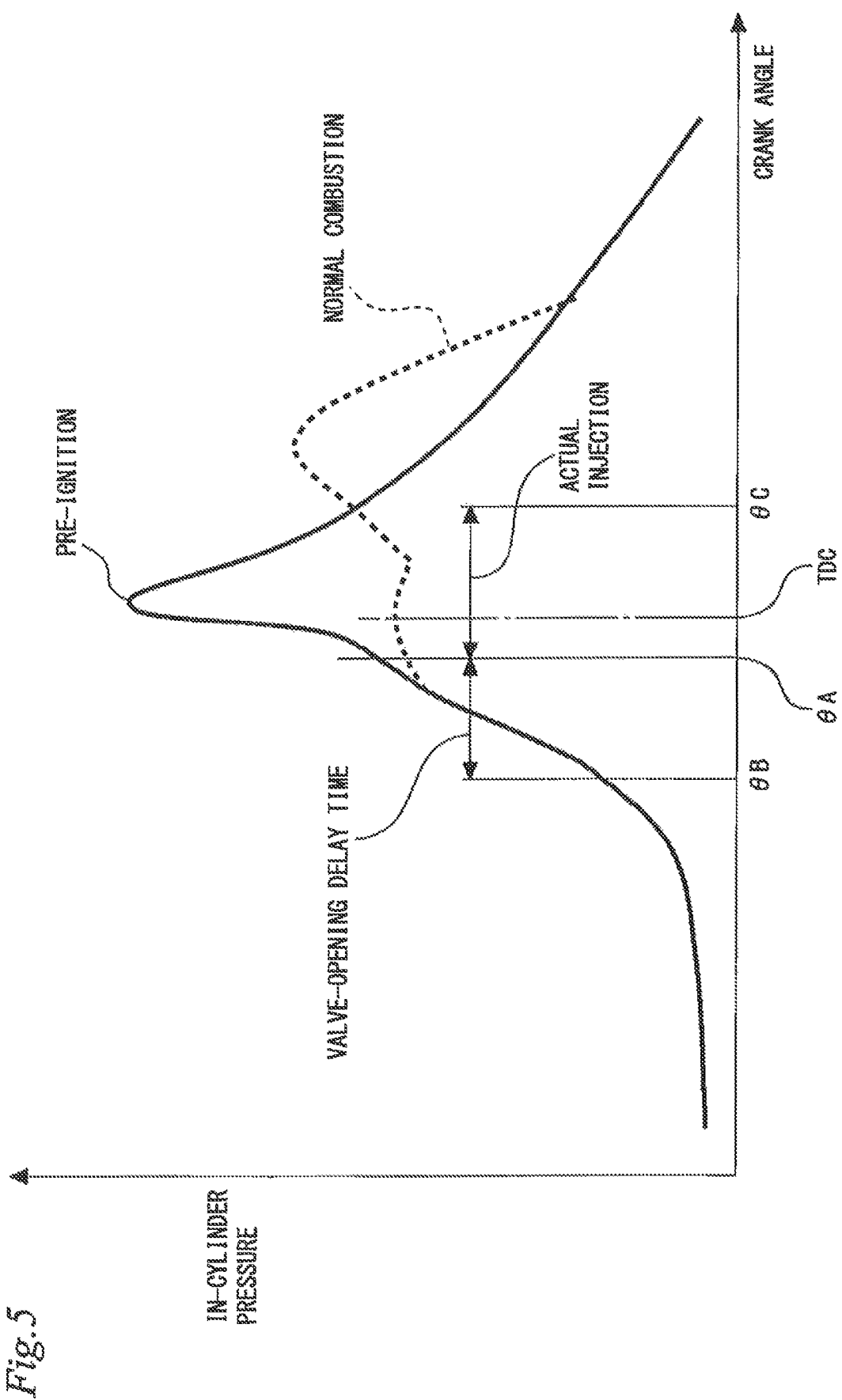
FIG. 5 is a graph that illustrates in-cylinder pressures in a compression stroke and an expansion stroke.

The present invention is not limited to the example shown in FIG. 4, and a time period from the crank angle θB to the crank angle θA may also be set to be less than or equal to the valve-opening delay time period of the injector 20. FIG. 5 illustrates an example of a case where the time period from the crank angle θB to the crank angle θA is equal to the valve-opening delay time period of the injector 20. As shown in FIG. 5, in a case where the time period from the crank angle θB to the crank angle θA is set to be less than or equal to the valve-opening delay time period of the injector 20, the actual injection has yet to start at the time of the crank angle θA. Accordingly, in a cycle in which the occurrence of pre-ignition is not detected until the time of the crank angle θA, the actual injection an be cancelled before starting by stopping energization of the injector 20 at the time of the crank angle θA. That is, in a cycle in which the occurrence of pre-ignition is not detected until the time of the crank angle θA, injection of fuel as the pre-ignition suppression infection is not executed. Consequently, even lower fuel consumption and lower emissions can be achieved.

Figure 6:
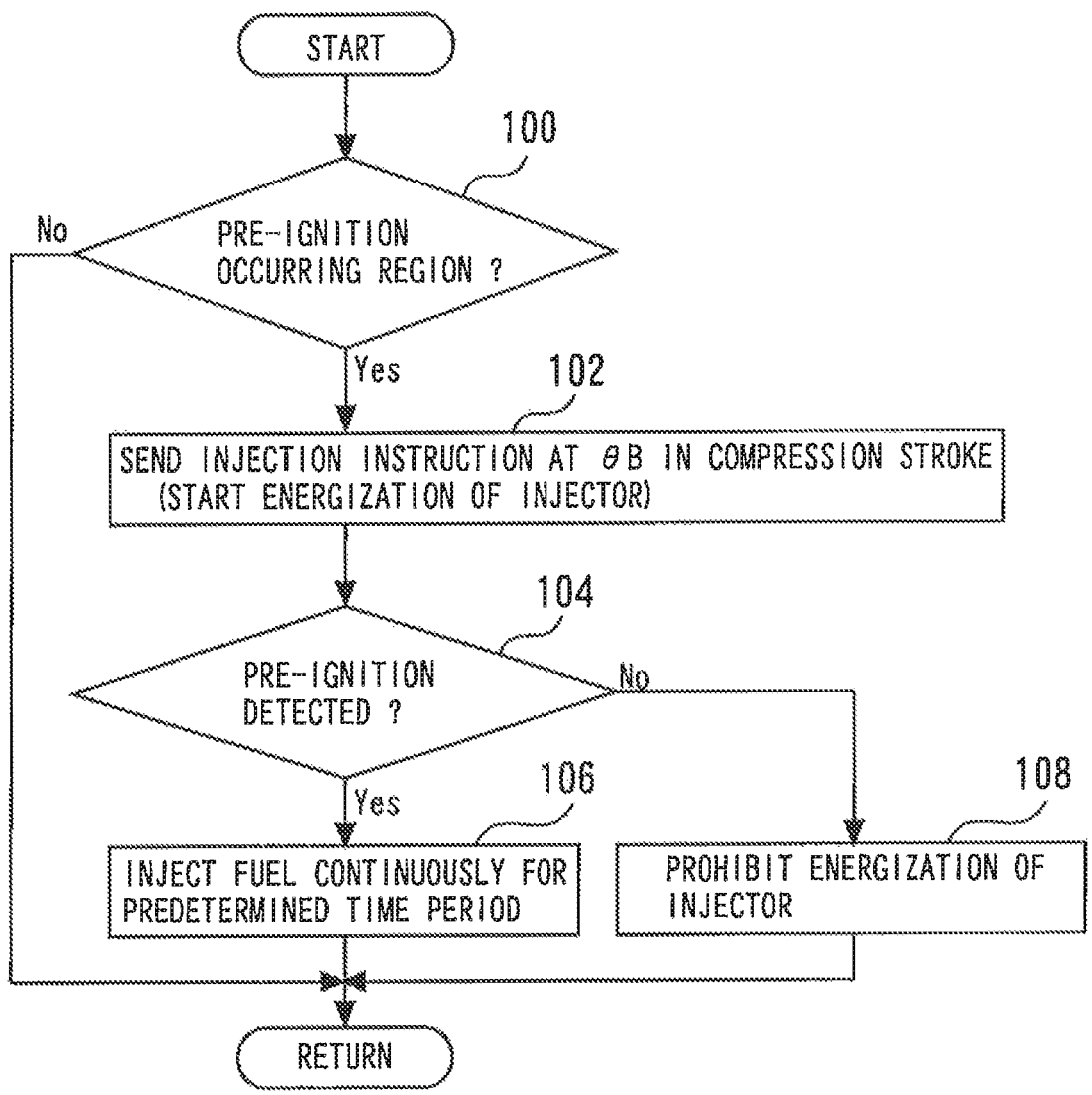
FIG. 6 is a flowchart illustrating a routine that is executed by Embodiment 1 of the present invention.

FIG. 6 is a flowchart of a routine that the ECU 50 executes according to the present embodiment to realize the above described functions. This routine is executed at each cycle of the internal combustion engine 10. According to the routine shown in FIG. 6, first the ECU 50 determines whether or not the operating state of the internal combustion engine 10 is a state in which there is a possibility of pre-ignition occurring (step 100). A map of a predetermined low-speed and high-load region in which there is a possibility of pre-ignition occurring is stored in the ECU 50. In the present step 100, if the current engine speed and engine load are within the aforementioned low-speed and high-load region, the ECU 50 determines that the operating state is a state in which there is a possibility of pre-ignition occurring. Otherwise, the ECU 50 determines that the operating state is not a state in which there is a possibility of pre-ignition occurring.

In the aforementioned step 100, if the ECU 50 determines that the operating state is not a state in which there is a possibility of pre-ignition occurring, the processing of the present routine is ended. In this case, the pre-ignition suppression injection is not performed. Thus, according to the present embodiment, since the pre-ignition suppression injection is not performed when the operating state is not one in which there is a possibility of pre-ignition occurring, lower fuel consumption is achieved. Further, since an air-fuel ratio deviation due to the pre-ignition suppression injection does not occur, lower emissions are achieved.

In contrast, in the aforementioned step 100, if the ECU 50 determines that the operating state is one in which there is a possibility of pre-ignition occurring, the ECU 50 sends an injection instruction to the injector 20 at the predetermined crank angle θB that is within the compression stroke range. As a result, energization of the injector 20 is started from the crank angle θB.

Subsequently, the aforementioned pre-ignition detection operation is executed until the time of the crank angle θA (step 104). If the occurrence of pre-ignition is detected by the time of the crank angle θA by the pre-ignition detection operation, fuel injection is continuously performed for a predetermined time period or until the predetermined crank angle θC (step 106). In contrast, if the occurrence of pre-ignition is not detected until the time of the crank angle θA, energization of the injector 20 is prohibited at that time point (step 108). That is, in this case, energization of the injector 20 is stopped at the time of the crank angle θA.

In the pre-ignition detection operation of the present embodiment, as described above, by detecting pre-ignition based on an index value of the amount of heat generation such as $PV^\kappa$ or $d(PV^\kappa)/d\theta$, the occurrence of pre-ignition can be accurately detected at an early stage (a time point at the start of combustion). As a result, the following advantages are obtained. As shown in FIG. 4, to reliably prevent an abnormal increase in the in-cylinder pressure that exceeds a design assurance in-cylinder pressure, it is necessary to execute the pre-ignition suppression injection as scheduled not only for the occurrence of pre-ignition as in form A and form B, but also for the occurrence of pre-ignition in which the start of combustion is relatively late, such as in form C. Therefore, it is necessary to set the crank angle θA to a crank angle that is late to a certain extent. If the crank angle θA is a crank angle that is too early, energization of the injector 20 will be stopped and the pre-ignition suppression injection will be stopped before pre-ignition in a case such as form C is detected. As a result, in some eases it will not be possible to avoid an abnormal increase in the in-cylinder pressure due to pre-ignition in a case such as form C. However, the later that the setting value of the crank angle θA is, the shorter that the period of time from the crank angle θA to the crank angle θC will be. The fuel reduction effect that is obtained in a case where the pre-ignition suppression injection is stopped is proportional to the length of the time period from the crank angle θA to the crank angle θC (denoted by reference character α in FIG. 4). Accordingly, the later that the setting value of the crank angle θA is, the larger that the fuel amount consumed by the pre-ignition suppression injection tends to be, and hence the effect of lower fuel consumption and lower emissions decreases. That is, from the viewpoint of increasing the effects of lower fuel consumption and lower emissions, it is desired to set the crank angle θA to as early a crank angle as possible. However, when employing a method which cannot detect pre-ignition at an early stage, since the timing at which pre-ignition such as in form C can be detected is late, it is necessary to set the setting value of crank angle θA to a late value to correspond therewith. In contrast, according to the pre-ignition detection operation of the present embodiment it is possible to accurately detect the occurrence of pre-ignition at an early stage, and hence pre-ignition such as in form C can be detected at as early a crank angle as possible. Therefore, the crank angle θA can be set to as early a crank angle as possible. Consequently, it is possible to reliably avoid an abnormal increase in the in-cylinder pressure that exceeds a design assurance in-cylinder pressure and also achieve a higher level of reduction in the fuel consumption and emissions in a compatible manner.

The pre-ignition detection operation of the present invention is not limited to an operation that detects pre-ignition based on an index value of the amount of heat generation, and may be an operation that detects pre-ignition based on a value of the in-cylinder pressure P that is detected by the in-cylinder pressure sensor 46 or an operation that detects pre-ignition by detecting an ion current that flows between electrodes of a spark plug or the like.

Although in the foregoing embodiment a case is described in which the present invention is applied to a spark-ignition internal combustion engine, the present invention can also be applied to an internal combustion engine other than a spark-ignition internal combustion engine such as, for example, a premixed compression ignition internal combustion engine or an internal combustion engine that combines use of premixed compression ignition and spark ignition.

In the foregoing Embodiment 1, "pre-ignition detection means" according to the above described first invention is realized by the ECU 50 executing the processing in the above described step 104, "injection instruction means" according to the above described first invention is realized by the ECU 50 executing the processing in the above described step 102, "injection control means" according to the above described second invention is realized by the ECU 50 executing the processing in the above described step 106, "energization stopping means" according to the above described third invention is realized by the ECU 50 executing the processing in the above described step 108, and "possibility determination means" according to the above described sixth invention is realized by the ECU 50 executing the processing in the above described step 100.

REFERENCE SIGNS LIST

10 internal combustion engine
12 piston
14 intake valve
16 exhaust valve
18 spark plug
20 injector
22 intake passage
24 exhaust passage
26 turbocharger
34 throttle valve
46 in-cylinder pressure sensor
50 ECU

The invention claimed is:

1. A control apparatus for an internal combustion engine that is an apparatus that controls an internal combustion engine including an injector that directly injects fuel into a cylinder, the control apparatus comprising:
   pre-ignition detection means that executes an operation to detect pre-ignition until a time of a crank angle θA; and injection instruction means that, at a time of a crank angle θB that is before the crank angle θA, sends to the injector an injection instruction for performing a fuel injection to suppress pre-ignition combustion after a main fuel injection.

2. The control apparatus for an internal combustion engine according to claim 1, further comprising injection control means that, if the pre-ignition detection means detects pre-ignition by the time of the crank angle θA, continuously performs fuel injection according to the injection instruction for a predetermined time period or until a crank angle θC that is after the crank angle θA.

3. The control apparatus for an internal combustion engine according to claim 1, further comprising energization stopping means that, in a case where the pre-ignition detection means does not detect pre-ignition until the time of the crank angle θA, stops energization of the injector that is started by the injection instruction.

4. The control apparatus for an internal combustion engine according to claim 3, wherein a period of time from the crank angle θB until the crank angle θA is less than or equal to a period of time that corresponds to a valve-opening delay time period of the injector.

5. The control apparatus for an internal combustion engine according to claim 3, wherein the time of the crank angle θA is after a time point at which the injector opens in accordance with the injection instruction and is before a scheduled ending time point of the fuel injection according to the injection instruction.

6. The control apparatus for an internal combustion engine according to claim 1, further comprising:
   possibility determination means that determines whether or not an operating state of the internal combustion engine is a state in which there is a possibility of pre-ignition occurring;
   wherein when a determination result of the possibility determination means is affirmative, the injection instruction means sends the injection instruction.

7. The control apparatus for an internal combustion engine according to claim 1, wherein the crank angle θB is within a compression stroke range.

8. The control apparatus for an internal combustion engine according to claim 1, wherein the crank angle θB is a crank angle that is before an earliest crank angle at which it is possible for pre-ignition to occur.

9. The control apparatus for an internal combustion engine according to claim 1, further comprising:
   an in-cylinder pressure sensor that detects a pressure in the cylinder; and
   index value calculation means that calculates an index value that serves as an index of an amount of heat generation, based on an in-cylinder pressure that is detected by the in-cylinder pressure sensor;
   wherein the pre-ignition detection means determines presence or absence of occurrence of pre-ignition based on the index value that is calculated by the index value calculation means.

10. The control apparatus for an internal combustion engine according to claim 9, wherein when the in-cylinder pressure is represented by "P", a volume inside the cylinder is represented by "V", and a ratio of specific heat of in-cylinder gas is represented by "κ", the index value is represented by $PV^\kappa$.

11. The control apparatus for an internal combustion engine according to claim 9, wherein when the in-cylinder pressure is represented by "P", a volume inside the cylinder is represented by "V", a ratio of specific heat of in-cylinder gas is represented by "κ", and a crank angle is represented by "θ", the index value is represented by $d(PV^\kappa)/d\theta$.

12. A control apparatus for an internal combustion engine that is an apparatus that controls an internal combustion engine including an injector that directly injects fuel into a cylinder, the control apparatus comprising:
   a pre-ignition detection device that executes an operation to detect pre-ignition until a time of a crank angle θA; and
   an injection instruction device that, at a time of a crank angle θB that is before the crank angle θA, sends to the injector an injection instruction for performing a fuel injection to suppress pre-ignition combustion after a main fuel injection.

\* \* \* \* \*